United States Patent [19]
Yamaguchi

[11] Patent Number: 5,841,964
[45] Date of Patent: Nov. 24, 1998

[54] OPERATING STATE MANAGEMENT SYSTEM

[75] Inventor: Hideki Yamaguchi, Tokyo, Japan

[73] Assignee: Canon Kabushiki Kaisha, Shimomaruko, Japan

[21] Appl. No.: 668,250

[22] Filed: Jun. 20, 1996

[30] Foreign Application Priority Data

Jun. 28, 1995 [JP] Japan ................................. 7-161798

[51] Int. Cl.$^6$ ........................................................ G01F 11/34
[52] U.S. Cl. ................................. 395/113.21; 385/113.1; 371/210
[58] Field of Search ..................... 395/183.21, 184.01, 395/182.18, 183.13, 183.2, 185.02, 185.1; 371/21.6

[56] References Cited

U.S. PATENT DOCUMENTS

| | | | |
|---|---|---|---|
| 4,817,418 | 4/1989 | Asami et al. | 395/183.21 |
| 4,821,267 | 4/1989 | Druegh et al. | 395/184.01 |
| 4,851,985 | 7/1989 | Burror et al. | 395/184.01 |
| 5,160,926 | 11/1992 | Schweitzer, III | 340/870.02 |
| 5,344,301 | 9/1994 | Kamiguchi et al. | 425/169 |
| 5,617,535 | 4/1997 | Aizama et al. | 395/183.22 |
| 5,673,194 | 9/1997 | Cipelletti et al. | 364/468.22 |

*Primary Examiner*—Albert Decady
*Assistant Examiner*—Scott T. Baderman
*Attorney, Agent, or Firm*—Morgan & Finnegan, LLP

[57] ABSTRACT

An operating state management system having database, to collect and totalize the operating states of production equipment and circumstances under which types of trouble occur in the production equipment, creates a record set Q of records in a designated range of times (ta, tb) on the basis of an operating status table in which the state of the production equipment and the time at which there is a change in the state are linked is stored in the data base in advance, and creates a trouble table on the basis of the record set Q (step S61–S73) and totalizes downtime of the production equipment by type of trouble on the basis of the trouble table (step S74).

38 Claims, 10 Drawing Sheets

FIG. 5 t: WORKING STATE OCCURRENCE TIME

FIG. 8

OPERATING STATUS TABLE

| RECORD | TIME OF OCCURRENCE | STATE | TYPE OF TROUBLE |
|---|---|---|---|
| 1 | 1994/12/27 08:00:00 | WORKING | |
| 2 | 1994/12/27 11:15:00 | TROUBLE SHUTDOWN | A |
| 3 | 1994/12/27 11:45:00 | WORKING | |
| 4 | 1994/12/27 11:55:00 | TROUBLE SHUTDOWN | B |
| 5 | 1994/12/27 12:15:00 | WORKING | |
| 6 | 1994/12/27 13:00:00 | TROUBLE SHUTDOWN | C |
| 7 | 1994/12/27 17:00:00 | PLANNED SHUTDOWN | |
| 8 | 1994/12/28 08:00:00 | WORKING | |
| ⋮ | | | |

FIG. 9

RECORD SET S

| RECORD | TIME OF OCCURRENCE | STATE | TYPE OF TROUBLE |
|---|---|---|---|
| 1 | 1994/12/27 08:00:00 | WORKING | |
| 2 | 1994/12/27 11:15:00 | TROUBLE SHUTDOWN | A |
| 3 | 1994/12/27 11:45:00 | WORKING | |
| 4 | 1994/12/27 11:55:00 | TROUBLE SHUTDOWN | B |
| 5 | 1994/12/27 12:15:00 | WORKING | |
| 6 | 1994/12/27 13:00:00 | TROUBLE SHUTDOWN | C |
| 7 | 1994/12/27 17:00:00 | PLANNED SHUTDOWN | |

FIG. 10

OPERATING STATUS TABLE

| RECORD | TIME OF OCCURRENCE | STATE |
|---|---|---|
| 1 | 1994/12/27 08:00:00 | WORKING |
| 2 | 1994/12/27 11:15:00 | TROUBLE SHUTDOWN |
| 3 | 1994/12/27 11:45:00 | WORKING |
| 4 | 1994/12/27 11:55:00 | TROUBLE SHUTDOWN |
| 5 | 1994/12/27 12:15:00 | WORKING |
| 6 | 1994/12/27 13:00:00 | TROUBLE SHUTDOWN |
| 7 | 1994/12/27 17:00:00 | PLANNED SHUTDOWN |
| 8 | 1994/12/28 08:00:00 | WORKING |
| ⋮ | | |

FIG. 11

RECORD SET Q

| RECORD | TIME OF OCCURRENCE | STATE |
|---|---|---|
| 1 | 1994/12/27 08:00:00 | WORKING |
| 2 | 1994/12/27 11:15:00 | TROUBLE SHUTDOWN |
| 3 | 1994/12/27 11:45:00 | WORKING |
| 4 | 1994/12/27 11:55:00 | TROUBLE SHUTDOWN |
| 5 | 1994/12/27 12:15:00 | WORKING |
| 6 | 1994/12/27 13:00:00 | TROUBLE SHUTDOWN |
| 7 | 1994/12/27 17:00:00 | PLANNED SHUTDOWN |

FIG. 12

TROUBLE TABLE

| RECORD | TIME OF OCCURRENCE | TYPE OF TROUBLE | END TIME |
|---|---|---|---|
| 1 | 1994/12/27 11:15:00 | A | |
| 2 | 1994/12/27 11:15:00 | B | |
| 3 | 1994/12/27 11:30:00 | C | |
| 4 | 1994/12/27 11:55:00 | A | |
| 5 | 1994/12/27 13:00:00 | A | |
| ⋮ | | | |

FIG. 13

TROUBLE TABLE

| RECORD | TIME OF OCCURRENCE | TYPE OF TROUBLE | END TIME |
|---|---|---|---|
| 1 | 1994/12/27 11:15:00 | A | 1994/12/27 11:45:00 |
| 2 | 1994/12/27 11:15:00 | B | 1994/12/27 11:45:00 |
| 3 | 1994/12/27 11:30:00 | C | 1994/12/27 11:45:00 |
| 4 | 1994/12/27 11:55:00 | A | 1994/12/27 12:15:00 |
| 5 | 1994/12/27 13:00:00 | A | 1994/12/27 17:00:00 |
| ⋮ | | | |

FIG. 14

TROUBLE DOWNTIME TOTAL

| TYPE OF TROUBLE | DOWNTIME TOTAL |
|---|---|
| A | 04:50:00 |
| B | 00:30:00 |
| C | 00:15:00 |

FIG. 15A

| |
|---|
| MODULE FOR CREATING OPERATING STATUS TABLE |
| MODULE FOR CREATING RECORD SET IN DESIGNATED PERIOD OF TIME |
| MODULE FOR TOTALIZING DOWNTIME DUE TO TROUBLE |
| MODULE FOR CREATING RECORD SET FOR TOTALIZING WORKING TIME |
| MODULE FOR TOTALIZING WORKING TIME |

FIG. 15B

| |
|---|
| MODULE FOR CREATING OPERATING STATUS TABLE |
| MODULE FOR CREATING RECORD SET IN DESIGNATED PERIOD OF TIME |
| MODULE FOR CREATING TROUBLE TABLE |
| MODULE FOR TOTALIZING DOWNTIME DUE TO TROUBLE |
| MODULE FOR CREATING RECORD SET FOR TOTALIZING WORKING TIME |
| MODULE FOR TOTALIZING WORKING TIME |

OPERATING STATE MANAGEMENT SYSTEM

BACKGROUND OF THE INVENTION

This invention relates to a system for managing the operating state of various production equipment in a production facility for producing industrial products and the like.

Production equipment for the production of industrial products and the like has recently undergone automation for the purpose of improving the productivity at which goods are produced by the equipment, thereby reducing unit cost. In production equipment of this kind, the need to automate production is accompanied by the need to grasp and manage production shutdown due trouble of some kind and to restore the equipment to the operating state quickly.

However, the higher the degree of automation, the more complicated the production equipment becomes. As a consequence, grasping and dealing with shutdown in the event of trouble also becomes more complicated.

Figure 7:
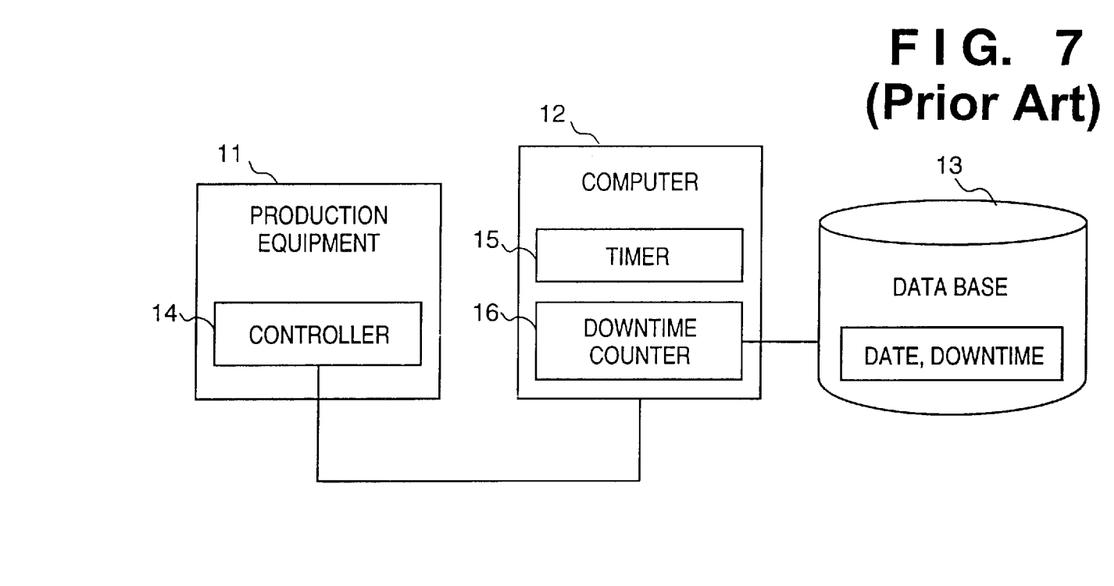
FIG. 7 illustrates the architecture of an operating state management system according to an example of the prior art.

FIG. 7 illustrates an example of a system for measuring the number of times trouble occurs in production equipment as well as the downtime caused by such trouble.

Specifically, FIG. 7 illustrates the architecture of an operating state management system according to an example of the prior art.

Production equipment 11 controlled by a controller 14 notifies a computer 12 of the type of trouble when the equipment ceases operating due to occurrence of trouble such as a malfunction. The computer 12 uses a timer 15 to measure, by type of malfunction, the number of times trouble occurs and uses a downtime counter 16 to measure, by type of trouble, downtime of the production equipment 11 caused by the trouble. Upon receiving trouble-type information from the production equipment 11, the computer 12 increments the trouble event count that corresponds to the type of trouble and starts measurement of downtime. Upon being started up again, the production equipment 11 sends a start-up signal to the computer 12. The latter receives the start-up signal and adds the downtime to the downtime counter 16 corresponding to the type of trouble that occurred. The event count and downtime thus measured by type of trouble are saved in a file in a database 13 at fixed times.

In accordance with the example of the prior art set forth above, the fact that the cause of trouble in production equipment is a defect in the workpiece introduced sometimes is ascertained after the fact. Trouble stemming from a defective workpiece should not be counted as trouble caused by the production equipment. Accordingly, in order to measure true downtime caused by a malfunction with the production equipment itself, it is necessary for the operator to subtract downtime caused by a workpiece defect from the measured downtime. This places a burden upon the operator. Further, there are instances where planned shutdown is performed. A planned shutdown refers to intentional shutdown of production equipment during working hours for the purpose of adjusting amount of production. In a case where production equipment is subjected to a planned shutdown when the equipment is down due to trouble, it is required that the operator operate the computer to suspend measurement of trouble downtime. If the operator forgets to perform this operation, however, planned downtime and trouble downtime will be added together, thus making it difficult to revise the trouble downtime correctly. Furthermore, if there is an increase in types of trouble possibly brought about by a change in the specifications of the production equipment, it is required that the activity management program of the computer be updated.

SUMMARY OF THE INVENTION

Accordingly, an object of the present invention is to provide an operating state management system for collecting and totalizing the operating states of production equipment and the circumstances under which types of trouble occur, wherein management of the collected data and modification of data after totalization can be performed with ease.

The present invention provides an operating state management system, a computer constituting the system, a computer-readable memory and production equipment.

Specifically, a computer for collecting and totalizing the operating states of production equipment and circumstances under which types of trouble occur is characterized by comprising correlating means for storing correlation data in an external database, the correlation data being obtained by linking the type of trouble that has occurred in production equipment, the state of the production equipment and time at which a change in the state occurred, and totalizing means for totalizing states of the production equipment in a designated range of time on the basis of the correlation data.

The operating state management system according to the invention is characterized by comprising the above-described computer, database means and production equipment.

In a preferred embodiment, the totalizing means comprises downtime totalizing means for totalizing downtime of the production equipment in the designated range of time on the basis of the correlation data, and/or operating time totalizing means for totalizing operating time of the production equipment in the designated ranges of times based upon the correlation data.

Alternatively, the present invention provides a computer for collecting and totalizing the operating states of production equipment and circumstances under which types of trouble occur, characterized by comprising first correlating means for storing first correlation data in an external database, the first correlation data being obtained by linking the state of the production equipment and time at which a change in the state occurred, second correlating means for storing second correlation data in the database, the second correlation data being obtained by linking the type of trouble that has occurred in the production equipment and time at which the production equipment shut down owing to occurrence of the trouble, and totalizing means for totalizing states of the production equipment in a designated range of time based upon the first and second correlation data.

The operating state management system according to the invention is characterized by comprising the above-described computer, database means and production equipment.

In a preferred embodiment, the totalizing means comprises downtime totalizing means for totalizing downtime of the production equipment in the designated range of time based upon the first and second correlation data, and/or operating time totalizing means for totalizing operating time of the production equipment in the designated range of time based upon the first and second correlation data.

Furthermore, the second correlation means is capable of correlating a plurality of troubles of different types that have occurred in the production equipment at the same times, wherein the second correlation means refers to the first correlation data to append, to the second correction data, times at which the production equipment resumed operation upon resolution of the troubles, and the downtime totalizing means totalizes downtime by type of trouble based upon the second correlation information.

In any case, it is preferred that the computer be capable of modifying the correlation data (or the first and second correlation data) and of re-totalizing the operating time and/or downtime based upon the modified correlation data. Further, it is preferred that the computer be capable of modifying type of shutdown of the production equipment contained in the correlation data (or first correlation data) and of excluding this from totalization performed by the downtime totalizing means.

The invention further provides production equipment having timekeeping means, characterized in that type of trouble that has occurred in production equipment and state of the production equipment are communicated to an external apparatus together with time data indicative of time at which a change in the state occurred.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description of the scope of the invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Embodiments of the invention will be described in which the invention is applied to an operating state management system shown in FIG. 1.

Figure 1:
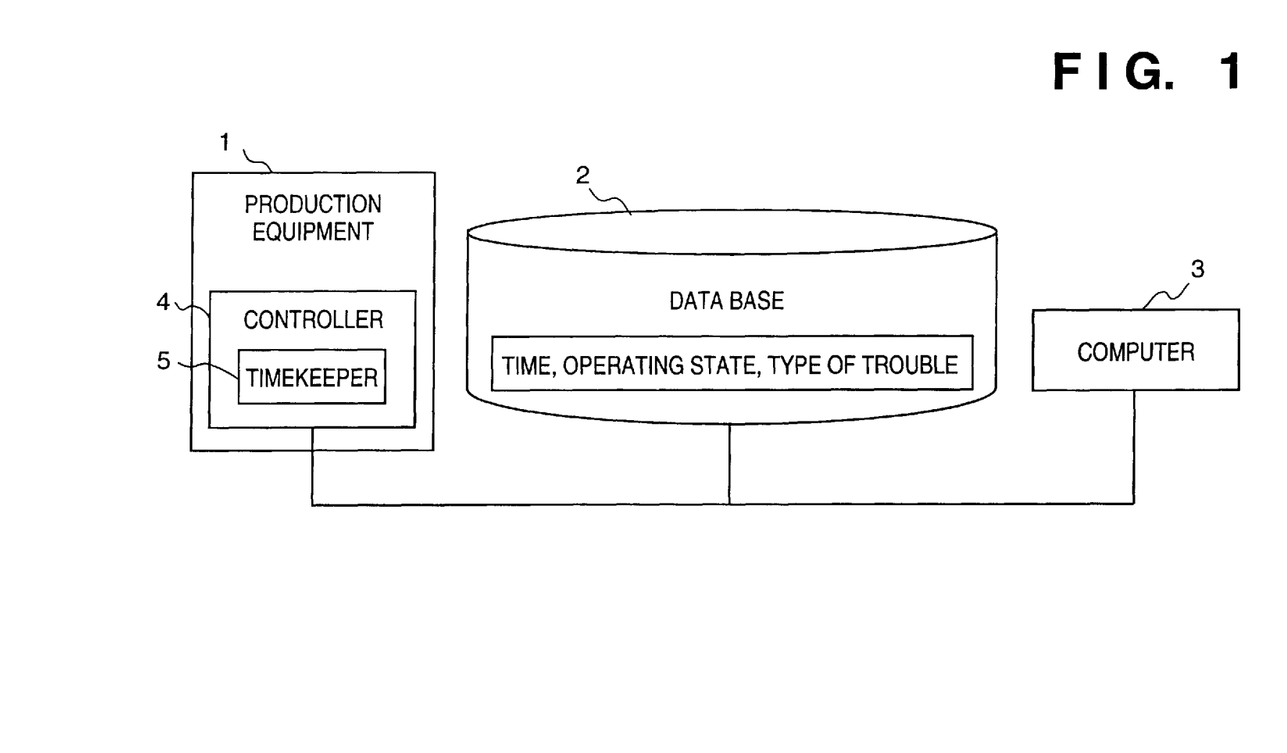
FIG. 1 illustrates the architecture of an operating state management system to which the present invention is applied.

FIG. 1 is a block diagram illustrating the architecture of an operating state management system to which the present invention is applied.

As shown in FIG. 1, the system includes production equipment 1, a database 2 and a computer 3. The computer 3 has a keyboard and a display, which are not shown.

The production equipment 1 includes a controller 4 having a timekeeper 5. The controller 4 controls the production equipment 1, which is connected to the database 2 and computer 3. When the production equipment 1 ceases operating owing to occurrence of trouble such as a malfunction, the production equipment 1 informs the computer 3 of the type of trouble as well as the time at which the operating state changed. While accessing the database 2, the computer 3 links and processes the type of trouble, operating state and time at which the operating state changed through a method described below.

The production equipment 1 has three operating states, namely a state in which production is being performed normally (referred to as the "working" state), a state in which production is being suspended intentionally (referred to as the "planned shutdown" state) and a state in which production is being suspended owing to trouble some kind (referred to as the "trouble shutdown" state). Assume that causes of trouble shutdown are of three types.

<First Embodiment>

A first embodiment of the invention will now be described based upon the hardware architecture shown in FIG. 1.

Figure 8:
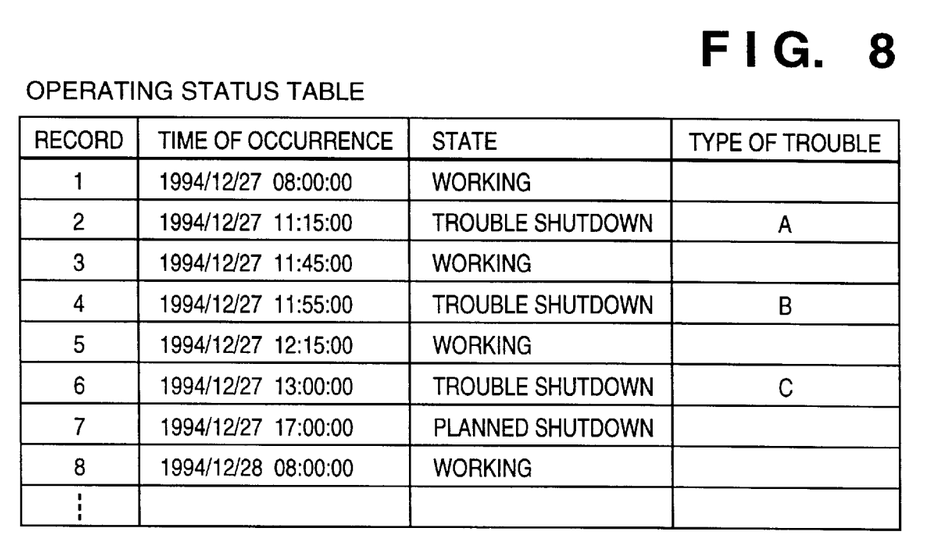
FIG. 8 is an operating status table according to the first embodiment of the invention.

FIG. 8 is an operating status table according to the first embodiment of the invention. The database 2, which includes the operating status table of FIG. 8, uses record numbers to manage fields of three kinds, namely time at which a change in state occurs, the state and the type of trouble, and stores these three fields in a time series.

A method of recording data in this operating status table will be described next.

(1) At occurrence of "working" state

The production equipment 1 attains the "working" state when it is started up. The controller 4 of the production equipment 1 reads time t1, which is the time at which the equipment attained the "working" state, out of the timekeeper 5 and communicates time t1 to the computer 3. The computer 3 creates a new record in the operating status table of database 2 and writes t1 in a time of occurrence field and "working" in a status field.

(2) At occurrence of "trouble shutdown" state

The production equipment 1 makes a transition to the "trouble shutdown" state when trouble of some kind arises. The controller 4 reads time t2, which is the time at which the equipment attained the "trouble shutdown" state, out of the timekeeper 5 and communicates time t2 to the computer 3. The computer 3 creates a new record in the operating status table of database 2, writes t2 in the time of occurrence field, "trouble shutdown" in the status field and the type of trouble in a trouble category field. When the operator eliminates the trouble and starts up the production equipment 1, the latter reverts to the "working" state, the controller reads time t3, which is the time at which the equipment reverted to the "working" state, out of the timekeeper 5 and communicates time t3 to the computer 3. The computer 3 creates a new record in the operating status table of database 2 and writes t3 in the occurrence time field and "working" in the status field.

(3) At occurrence of "planned shutdown" state

In a case where the production equipment 1 is placed in planned shutdown as by an operation performed by the operator, the controller 4 reads time t4, which is the time at which the equipment attained the "planned shutdown" state, out of the timekeeper 5 and communicates time t5 to the computer 3. The computer 3 creates a new record in the operating status table of database 2, writes t4 in the occurrence time field and "planned shutdown" in the status field.

A procedure will be described for obtaining the total of downtime by type of trouble that has occurred between arbitrary times ta and tb entered by the operator from the keyboard (not shown) of the computer 3.

Figure 2:
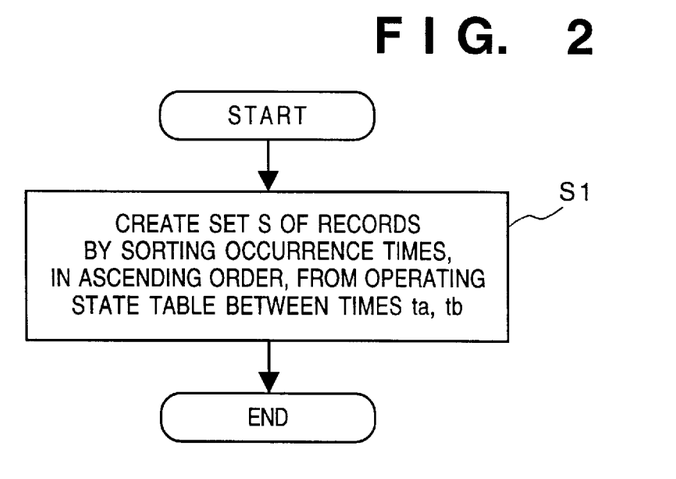
FIG. 2 is a flowchart for creating a record set S according to the first embodiment of the present invention.
Figure 9:
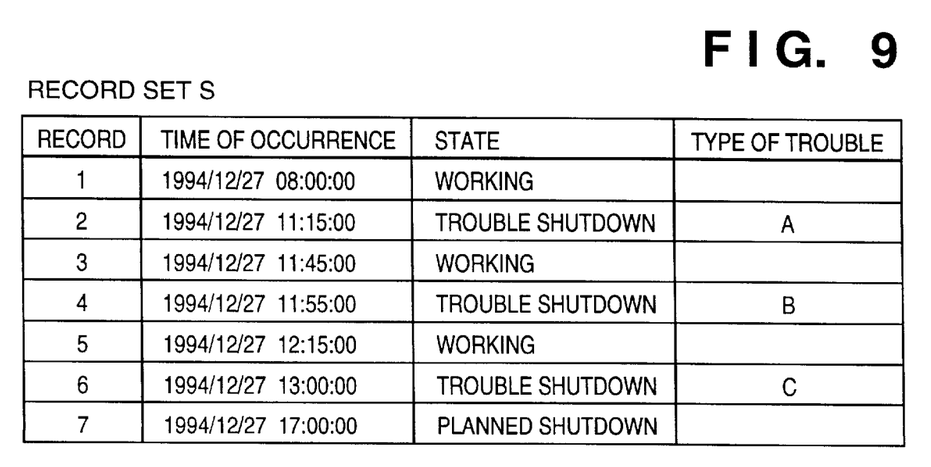
FIG. 9 is a table showing a record set S according to the first embodiment of the invention.

First, a record set S shown in FIG. 9 is created from the operating status table of FIG. 8 in accordance with the flowchart of FIG. 2.

FIG. 2 is a flowchart for creating the record set S according to the first embodiment of the present invention.

At step S1 in FIG. 2, the operating status table is sorted in ascending order of times of occurrence between times of occurrence ta and tb to create the record set S.

FIG. 9 is a table illustrating the record set S according to the first embodiment. According to the first embodiment, it is assumed that ta=Dec. 12, 1994, 08:00 and tb=Dec. 12, 1994, 17:00 hold.

Next, from the record set S of FIG. 9, total downtime is obtained by type of trouble that has occurred between the times ta and tb.

Figure 4:
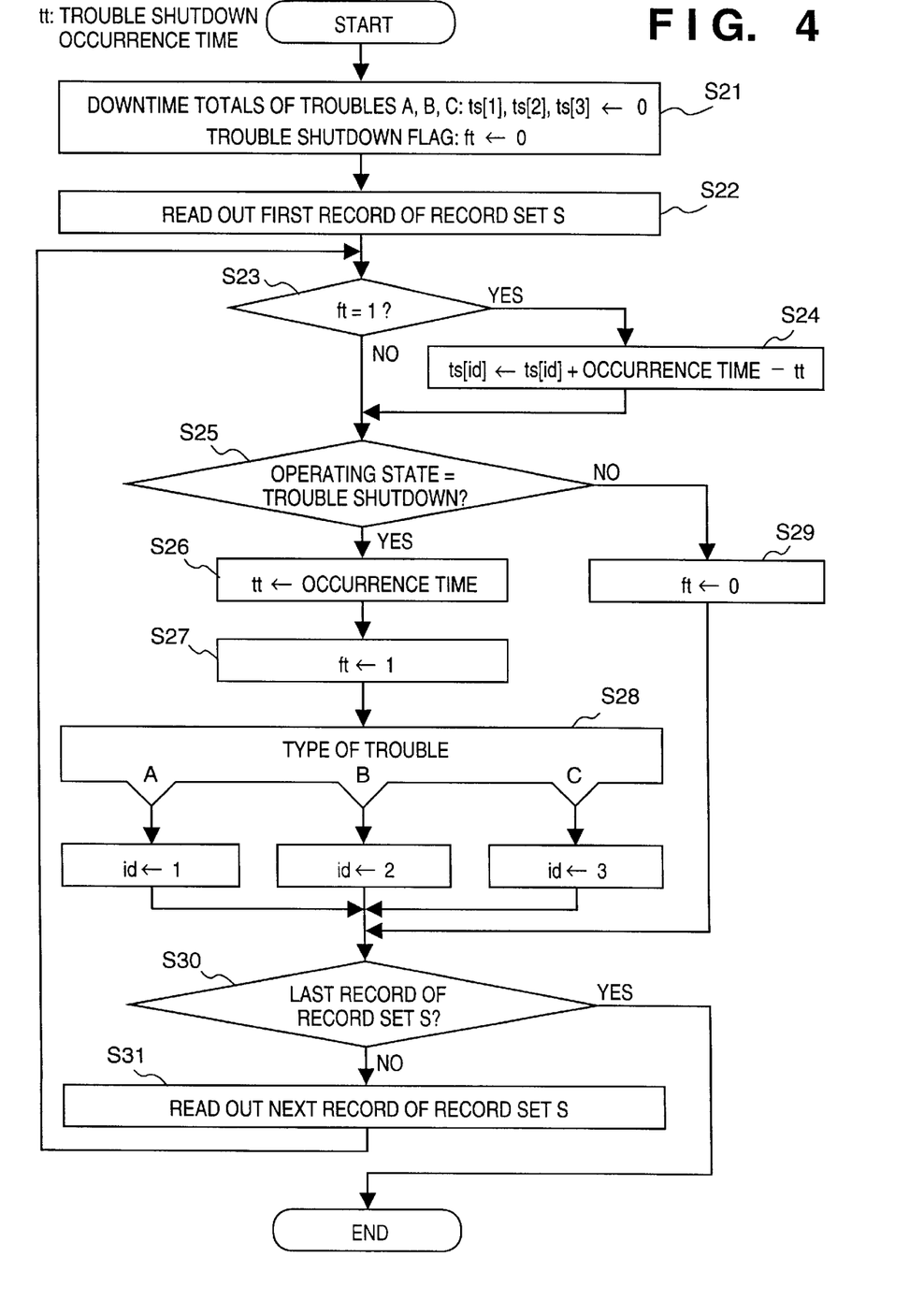
FIG. 4 is a flowchart for calculating downtime due to trouble according to the first embodiment of the present invention.

FIG. 4 is a flowchart for calculating trouble downtime according to the first embodiment of the invention.

First, at step S21 representing initialization processing, 0 is substituted into downtime totals ts[1], ts[2], ts[3] and 0 is substituted into a flag ft, which is a flag indicating that the current state is the trouble shutdown state. Next, the first record of the record set S is read out (step S22). If the trouble shutdown flag ft is 0 ("NO" at step S23) and the status field of the record is trouble shutdown ("YES" at step S25), then the trouble type is read out of the trouble category field and the time of occurrence is substituted into trouble occurrence time tt (step S26), 1 is substituted into the trouble shutdown flag ft (step S27) and 1, 2 or 3 is substituted into id, depending upon whether the trouble is of type A, B or C (step S28). If the record being processed is not the final record of the record set S ("NO" at step S30), then the next record is read out (step 31). If the trouble shutdown flag ft is found to be 1 ("YES" at step S23), then the difference between the time in the occurrence time field and the trouble occurrence time tt is added to the total downtime ts[id] (step S24).

By repeating the foregoing processing up to the final record, the downtime totals ts[1], ts[2], ts[3] of the trouble record, types A, B, C, respectively, between the arbitrary times ta and tb are found.

Described next will be processing for revising the status field of the operating status table in FIG. 8 and totalizing trouble downtime.

By way of example, consider a case where it is found that the cause of trouble that occurred on the afternoon of Dec. 27, 1994 is not a malfunction in the production equipment 1 and that the equipment ceased operating because of the absence of a workpiece to be machined, thus requiring that the cause of shutdown be rewritten to indicate planned shutdown. In such case the operator retrieves the operating status table in the database 2 of computer 3, reads out the record whose occurrence time is the afternoon of Dec. 27, 1994 and whose operating state is the trouble shutdown state and updates this to "planned shutdown". It will then suffice to execute the processing of FIGS. 2 and 4 to re-totalize the trouble downtime.

Processing for totalizing trouble downtime upon revising the occurrence time field of the operating status table of FIG. 8 will now be described.

For example, assume a case where the occurrence time of planned shutdown which occurred on Dec. 27, 1994, 17:00:00 is revised to Dec. 27, 1994, 14:00:00, followed by totalizing the trouble downtime. In such case it will suffice for the operator to read the relevant planned shutdown record out of the operating status table, revise the occurrence time and re-totalize the trouble downtime by the processing of FIGS. 2 and 4.

Processing for totalizing working time will now be described.

Figure 3:
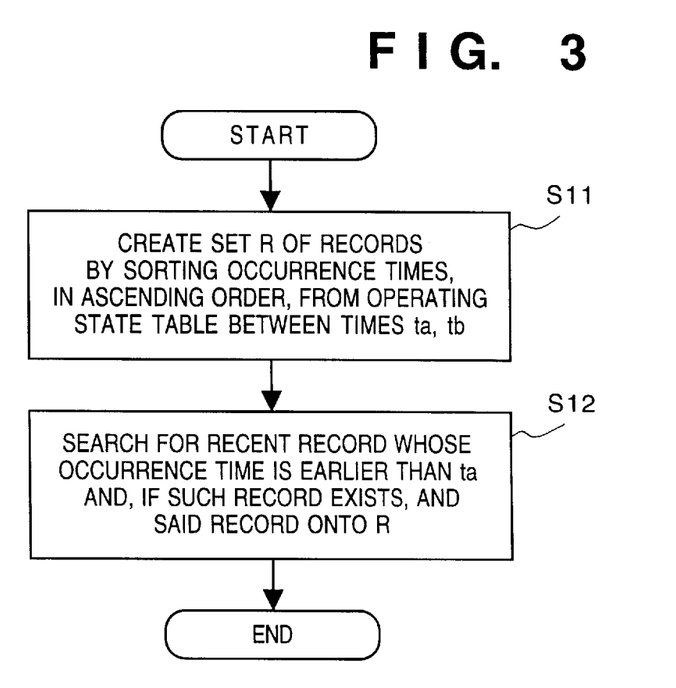
FIG. 3 is a flowchart for creating a record set R according to the first embodiment of the present invention.

First, a record set R is created from the operating status table of FIG. 8 in accordance with the flowchart of FIG. 3.

FIG. 3 is a flowchart for creating the record set R according to the first embodiment of the present invention.

At step S11 in FIG. 3, the operating status table is sorted in ascending order of times of occurrence between times of occurrence ta and tb to create the record set R. Next, at step S12, a search is performed for a recent record whose occurrence time is earlier than ta. If such a record exists, this record is added onto R.

Next, the total working time between the times ta and tb is determined from the record set R that has been created.

Figure 5:
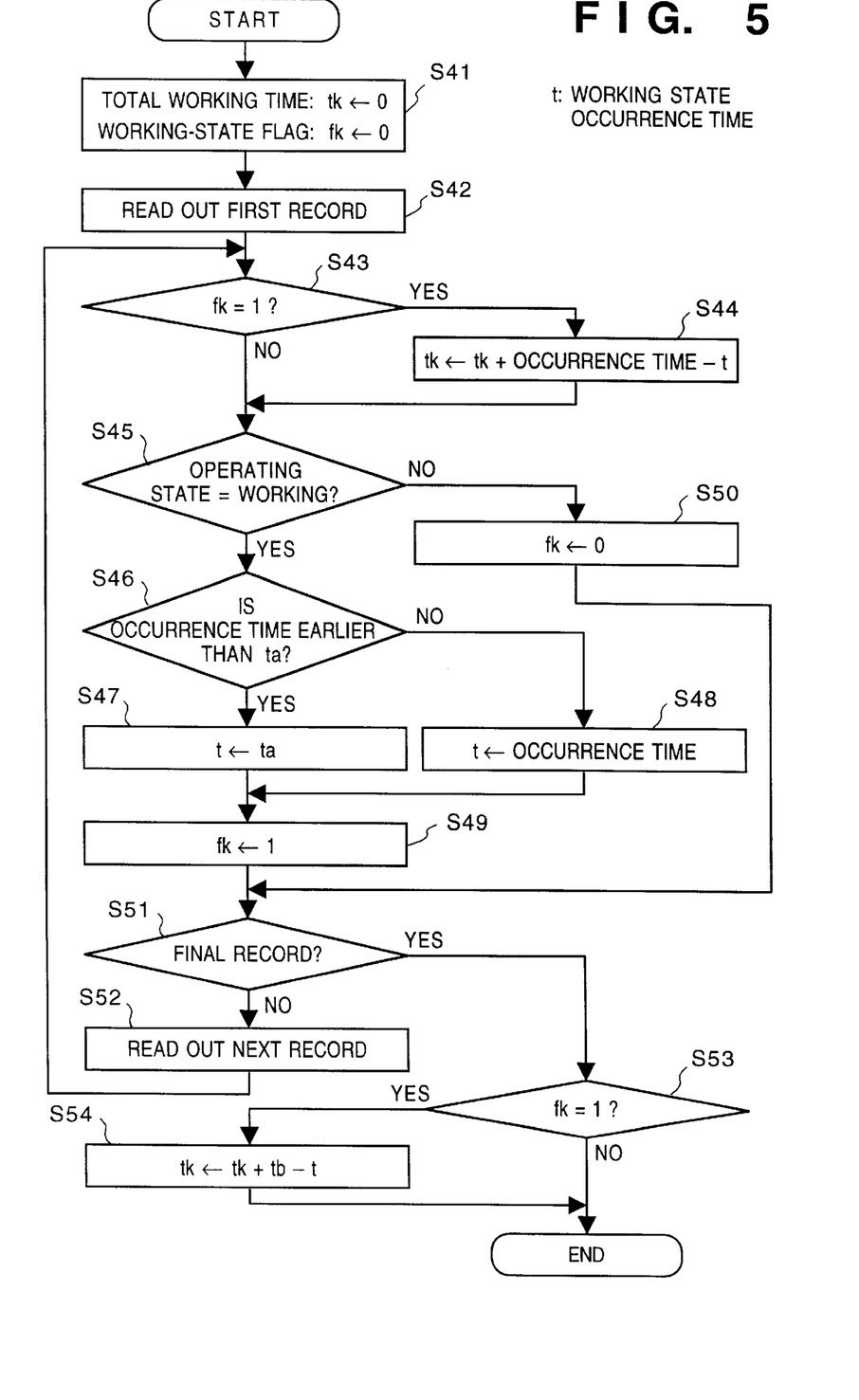
FIG. 5 is a flowchart for calculating operating time according to the first embodiment of the present invention.

FIG. 5 is a flowchart for calculating working time according to the first embodiment of the invention.

First, at step S41 representing initialization processing, 0 is substituted into total working time tk and 0 is substituted into a flag fk, which is a flag indicating that the current state is the working state. Next, the first record of the record set R is read out (step S42). If the flag fk indicating that operation is in progress is 0 ("NO" at step S43) and the status field of the record is "working" state ("YES" at step S45), then it is determined whether the time of occurrence of the working state is earlier than ta (step S46). If the time of occurrence is earlier than ta ("YES" at step S46), then ta is substituted into occurrence time t of the working state at step S47 and the flag fk indicating that the working state is in effect is made 1 (step S49). On the other hand, if the time of occurrence is later than ta ("NO" at step S46), then the occurrence time of the working state is substituted into ta as is (step S48). If the record currently being processed is not the final record of the record set S ("NO" at step S51), then the next record is read out (step 52). If the working state flag fk is found to be 1 ("YES" at step S53), then the difference between the time in the occurrence time field and the working state occurrence time t is added to the total working time tk (step S44). In a case where the record is the last record ("YES" at step S51), then the difference between tb and the working state occurrence time t is added to the total working time tk if the working state is determined to be in effect at step S53.

By repeating the foregoing processing up to the final record, the total working time tk is found. Total time with regard to planned shutdown can be calculated through the same technique and need not be described here.

Thus, the production equipment 1 is provided with the timekeeper 5 and a change in the state of the production equipment is stored in the database 2 in the form of time data. As a result, re-totalization processing following stored data maintenance can be implemented with ease.

In addition, fields of three kinds, namely time at which a change in state occurs in the production equipment 1, the state per se and the type of trouble are managed using record numbers and these are stored in the database 2 in a time series. As a result, modification of trouble type after totalization can be performed with ease as well as re-totalization if the modified trouble type is used.

<Second Embodiment>

An embodiment based upon the hardware architecture of FIG. 1 will be described for a case where troubles occur at the same time or at different times while the production equipment 1 is down.

Figure 10:
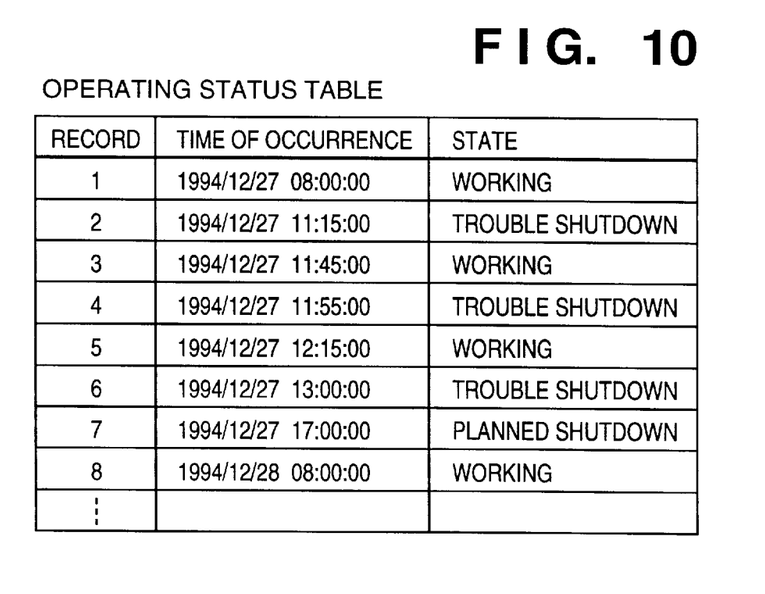
FIG. 10 is an operating status table according to the second embodiment of the invention.
Figure 12:
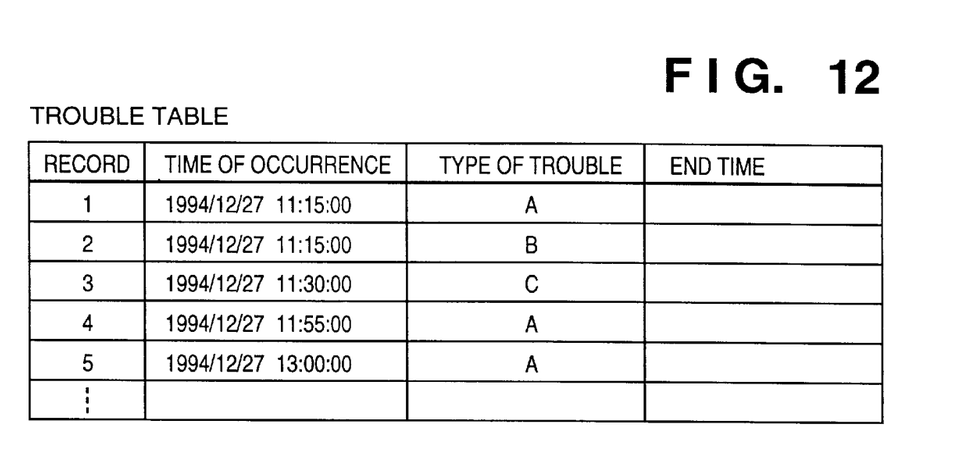
FIG. 12 is trouble table according to the second embodiment of the invention.

The database 2 in this case stores an operating status table of FIG. 10, which has an occurrence time field and an operating status field, and a trouble table of FIG. 12, which has an occurrence time field, a trouble category field and an end time field.

FIG. 10 is an operating status table according to the second embodiment of the invention, and FIG. 12 is trouble table according to the second embodiment of the invention.

A method of recording data in the above-mentioned operating status table will now be described.

(1) At occurrence of "working" state

The production equipment 1 attains the "working" state when it is started up. The controller 4 of the production equipment 1 reads time t1, which is the time at which the equipment attained the "working" state, out of the timekeeper 5 and communicates time t1 to the computer 3. The computer 3 creates a new record in the operating status table of database 2 and writes t1 in a time of occurrence field and "working" in a status field.

(2) At occurrence of "trouble shutdown" state

The production equipment 1 makes a transition to the "trouble shutdown" state when trouble of some kind arises. The controller 4 reads time t2, which is the time at which the equipment attained the "trouble shutdown" state, out of the timekeeper 5 and communicates time t2 to the computer 3. The computer 3 creates a new record in the operating status table (FIG. 10) of database 2, writes t2 in the time of occurrence field and "trouble shutdown" in the status field, creates a new record in the trouble table (FIG. 12) of the database 2, writes t2 in the occurrence time field and the type of trouble in the trouble category field.

In a case where a plurality of troubles have occurred simultaneously, the computer 3 creates a new record for each trouble in the trouble table, writes t2 for each trouble in the occurrence time field and writes the type of each trouble in the trouble category field. In a case where trouble occurs again at a time after trouble downtime, the controller 4 reads this time (time t21) out of the timekeeper 5 and communicates t21 to the computer 3. The computer 3 creates a new record in the trouble table of the database 2, writes t21 in the occurrence time field and the type of trouble in the trouble category field.

When the operator eliminates the trouble and starts up the production equipment 1, the latter reverts to the "working" state, the controller reads time t3, which is the time at which the equipment reverted to the "working" state, out of the timekeeper 5 and communicates time t3 to the computer 3. The computer 3 creates a new record in the operating status table of database 2 and writes t3 in the occurrence time field and "working" in the status field.

(3) At occurrence of "planned shutdown" state

In a case where the production equipment 1 is placed in planned shutdown as by an operation performed by the operator, the controller 4 reads time t4, which is the time at which the equipment attained the "planned shutdown" state, out of the timekeeper 5 and communicates time t5 to the computer 3. The computer 3 creates a new record in the operating status table of database 2, writes t4 in the occurrence time field and "planned shutdown" in the status field.

Figure 11:
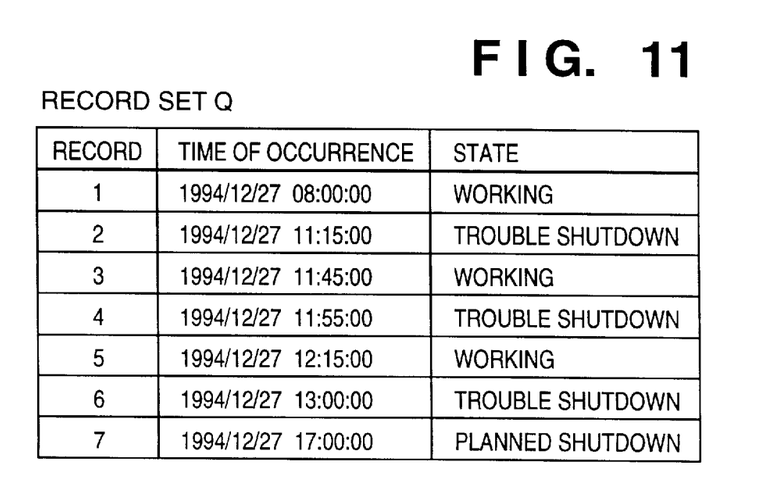
FIG. 11 is a table showing a record set Q according to the second embodiment of the invention.

According to a procedure by which the computer 3 obtains the total downtime by type of trouble that has occurred between arbitrary times ta and tb, first a record set Q of the kind shown in FIG. 11 is created from the operating table of FIG. 10 in accordance with the flowchart of FIG. 2 in a manner similar to that described in the first embodiment.

It should be noted that totalization of working time is performed through the procedure of FIGS. 3 and 5 of the first embodiment and need not be described again.

FIG. 11 is a table illustrating a record set Q according to a second embodiment of the invention. According to the second embodiment, it is assumed that ta=Dec. 27, 1994, 08:00 and tb=Dec. 27, 1994, 17:00 hold.

Next, from the record set Q of FIG. 11 and the trouble table of FIG. 12, the total downtime is obtained by type of trouble that has occurred between the times ta and tb.

Figure 6:
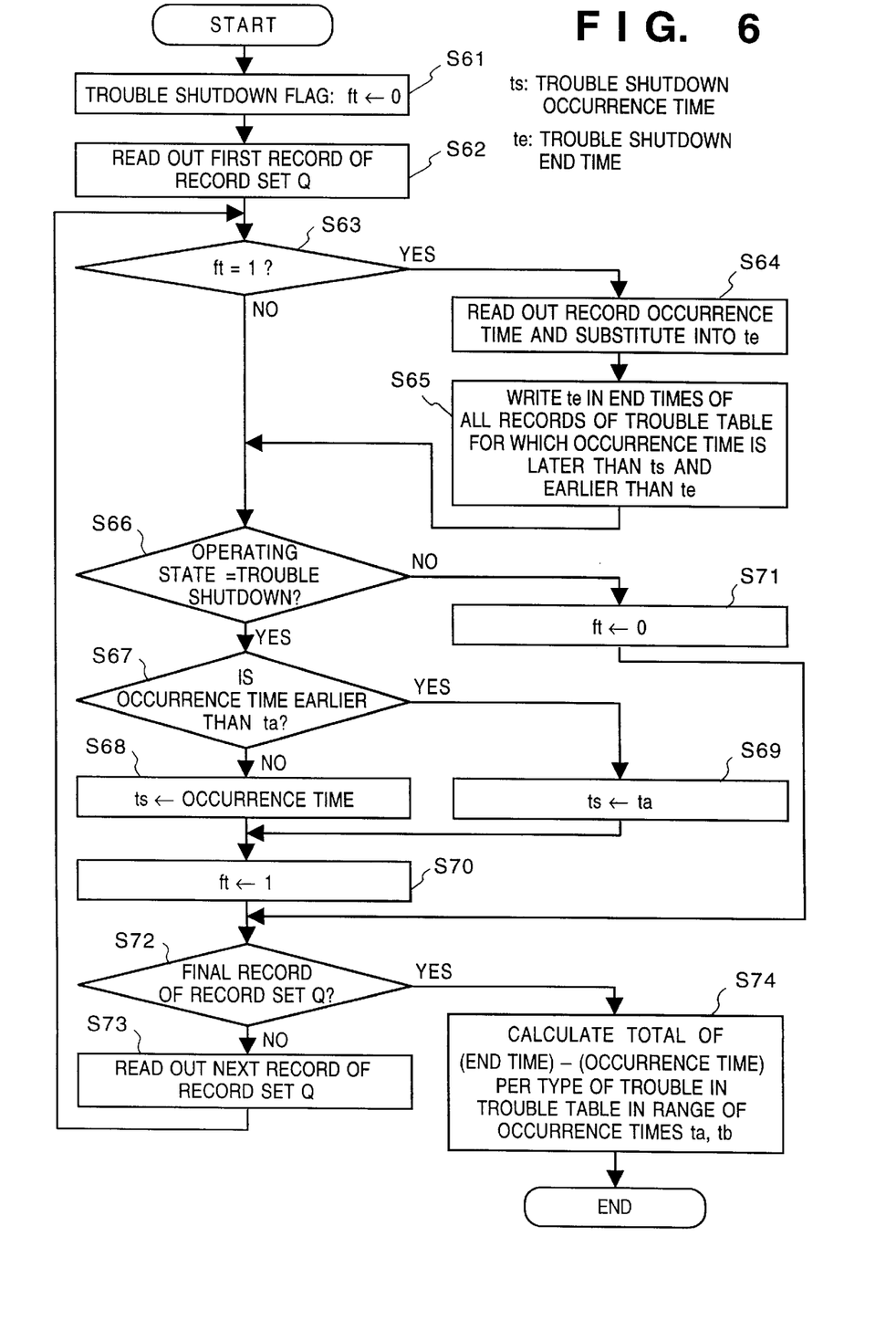
FIG. 6 is a flowchart for calculating downtime due to trouble according to a second embodiment of the present invention.

FIG. 6 is a flowchart for calculating trouble downtime according to the second embodiment of the invention.

First, at step S61 representing initialization processing, 0 is substituted into a flag ft, which is a flag indicating that the current state is the trouble shutdown state. Next, the first record of the record set Q of FIG. 11 is read out at step S62. If the trouble shutdown flag ft is 0 ("NO" at step S63) and the status field of the record is trouble shutdown ("YES" at step S66), then ta is substituted into the occurrence time ts of trouble shutdown (step S69) provided that the occurrence time is earlier than the occurrence time ta ("YES" at step S67). On the other hand, if the occurrence time is later than the occurrence time ta ("NO" at step S67), then the value in the occurrence time field of the operating status table of FIG. 10 is substituted into the occurrence time ts of trouble shutdown (step S68). Next, 1 is substituted into the trouble shutdown flag ft (step S70). If the record being processed is not the final record of the record set S ("NO" at step S72), then the next record is read out (step 73). If the trouble shutdown flag ft is found to be 1 ("YES" at step S63), then the occurrence time of the record is substituted into the end time te of trouble shutdown (step S64) and te is written in the end times of all records of the trouble table in FIG. 12 for which the occurrence time is later than ts and earlier than te (step S65). In other words, records for which troubles have occurred repeatedly at the same or different times during shutdown of the production equipment 1 are written in the table. The written results are as shown in FIG. 13.

Figure 13:
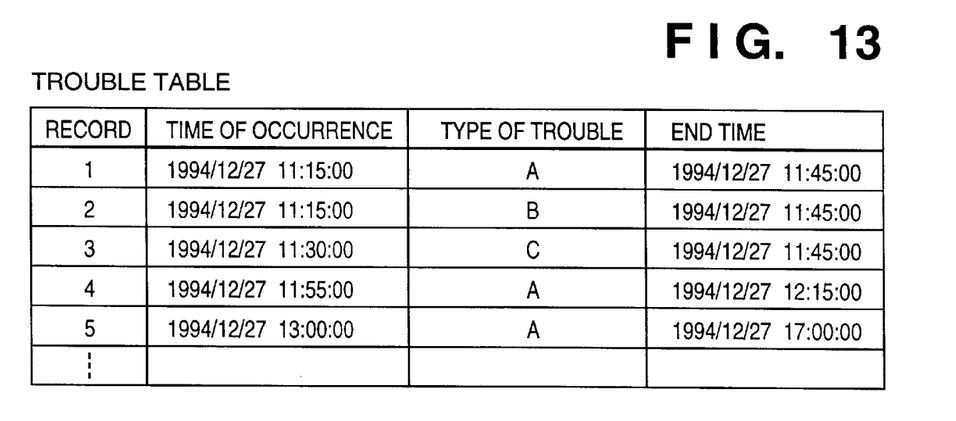
FIG. 13 is trouble table (after writing of end times) according to the second embodiment of the invention.

FIG. 13 is a trouble table (after writing of end times) according to the second embodiment of the invention.

Figure 14:
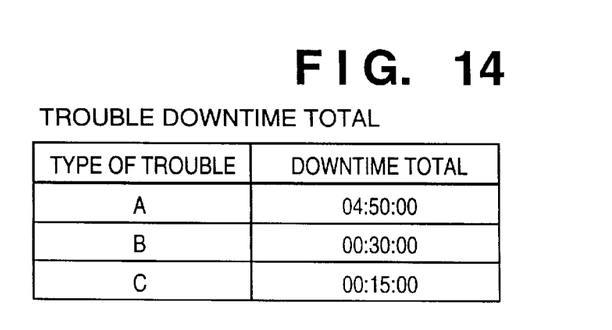
FIG. 14 is a table showing totals of downtime due to trouble according to the second embodiment of the invention.

Total downtime by type of trouble as shown in FIG. 14 is obtained by repeating the foregoing processing up to the final record and calculating, by type of trouble, the downtime of the production equipment 1 in the range of occurrence times ta, tb, namely the total of the differences between end times and occurrence times in the trouble table of FIG. 13 (step S74).

FIG. 14 is a table showing totals of trouble downtime according to the second embodiment of the invention;

Described next will be processing for revising the operating status table in FIG. 10 and totalizing trouble downtime.

By way of example, consider a case where it is found that the cause of trouble that occurred on the afternoon of Dec. 27, 1994 is not a malfunction in the production equipment 1 and that the equipment ceased operating because of the absence of a workpiece to be machined, thus requiring that the cause of shutdown be rewritten to indicate planned shutdown. In such case the operator retrieves the operating status table in the database 2 of computer 3, reads out the record whose occurrence time is the afternoon of Dec. 27, 1994 and whose operating state is the trouble shutdown state and updates this to "planned shutdown". It will then suffice to execute the above-described processing again.

Processing for totalizing trouble downtime upon revising occurrence time will now be described.

For example, assume a case where the occurrence time of planned shutdown which occurred on Dec. 27, 1994, 17:00:00 is revised to Dec. 27, 1994, 14:00:00, followed by totalizing the trouble downtime. In such case it will suffice for the operator to read the relevant planned shutdown record out of the operating status table, revise the occurrence time and re-totalize the trouble downtime by the processing described above.

With regard to totalization of working time, computation is performed based upon the operating status table of FIG. 10 in accordance with the flowchart of FIG. 5 in a manner similar to that described in the first embodiment, thus making it possible to obtain total working time between the limits of times ta and tb. Furthermore, total time can be calculated with regard to planned shutdown as well.

A case in which type of trouble is added on will now be described.

In a case where the specifications of the production equipment 1 are changed and trouble of a type D occurs anew, the operator need only add a trouble type D to the definitions of the already existing troubles A, B, C and to the flowchart of FIG. 4 and write the trouble type D to the trouble table of FIG. 12 when the trouble occurs, thereby making it possible to totalize trouble downtime by the processing of the second embodiment described above.

Thus, the production equipment 1 is provided with the timekeeper 5 and a change in the state of the production equipment is stored in the database 2 in the form of time data. As a result, re-totalization processing following stored data maintenance can be implemented with ease.

Further, two types of tables, namely the operating status table and the trouble table, are used in the database 2, and trouble occurrence time and end time are stored in the database per each record of the trouble table. As a result, even when troubles occur repeatedly at the same or different times while the production equipment 1 is down, downtime can be readily totalized by type of trouble.

Furthermore, since the two types of tables, namely the operating status table and the trouble table, are used in the database 2, processing for totalizing individual types of trouble and processing for totalizing trouble downtimes can be made independent of each other. In other words, variables for processing specific to individual types of trouble can be eliminated. As a result, even if a new type of trouble occurs owing to a change in the specifications of the production equipment 1, this can be dealt with easily by adding on the definition of the type of trouble.

The present invention is not limited to the system architectures of the foregoing embodiments and can be applied to a system constituted by a plurality of devices (e.g., a host computer, server interface, reader and printer) or to an apparatus comprising a single device (e.g., a copier or facsimile machine, etc.).

Further, it goes without saying that the object of the present invention can also be achieved by providing a storage medium storing the program codes of the software for performing the aforesaid functions of the embodiment to a system or an apparatus, reading the program codes with a computer (e.g., a CPU or MPU) of the system or apparatus from the storage medium, then executing the program.

In this case, the program codes read from the storage medium realize the functions of the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written in a function extension card inserted into the computer or in a memory provided in a function extension unit connected to the computer, a CPU or the like contained in the function extension card or function extension unit performs a part of or the entire process in accordance with the designation of program codes and implements the function of the above embodiments.

In the case where the present invention is applied to the aforesaid storage medium, the storage medium stores program codes corresponding to the flowcharts described in the embodiments. Briefly, the storage medium stores each module shown as an example of a memory map in FIGS. 15A and 15B.

Figure 15A:
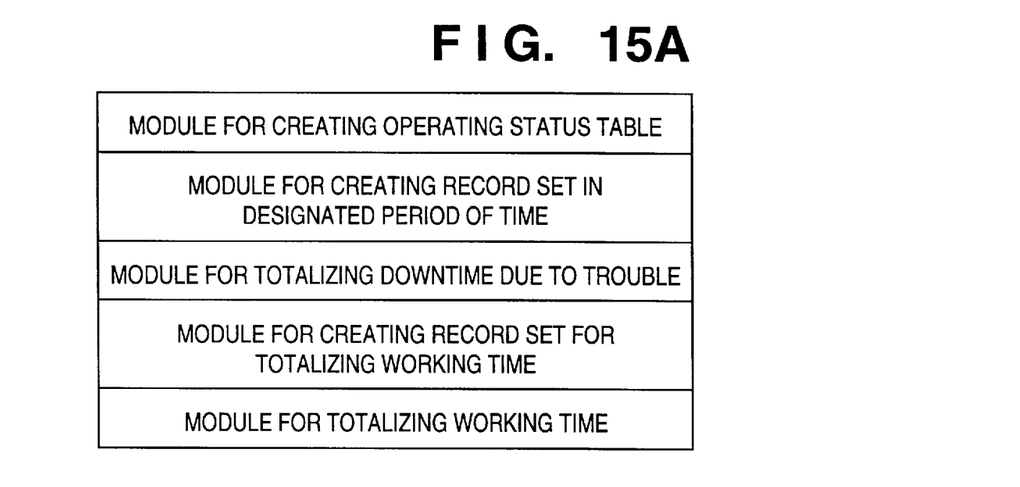
FIG. 15A is a diagram showing an example of a memory map in an information processor according to the first embodiment of the invention.

More specifically, in the first embodiment, program codes that correspond to at least a module for creating the operating status table, a module for creating a record set in the designated period of time, a module for totalizing downtime due to trouble, a module for creating the record set for totalizing working time and the module for totalizing working time may be stored in the storage medium of computer 3 (see FIG. 15A).

Figure 15B:
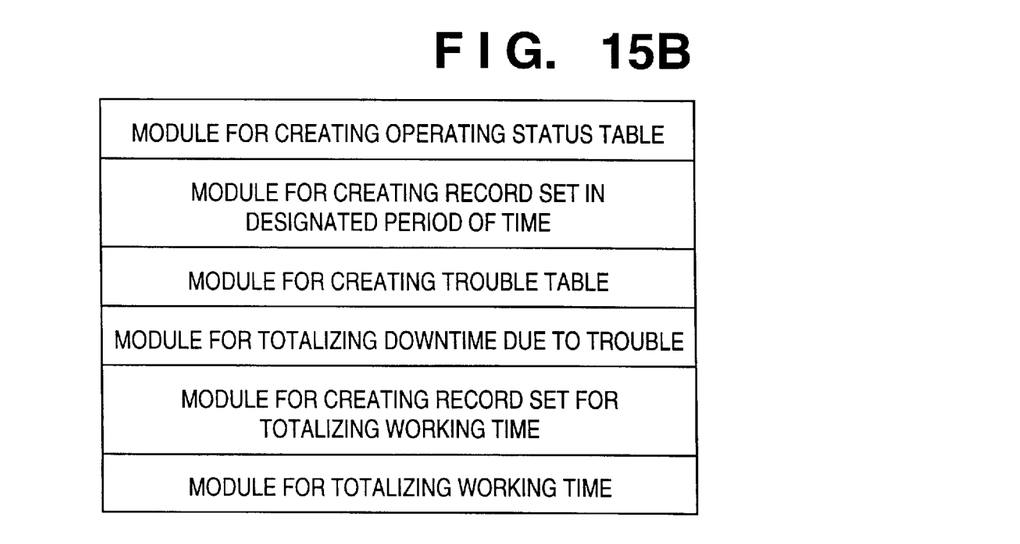
FIG. 15B is a diagram showing an example of a memory map in an information processor according to the second embodiment of the invention.

Similarly, in the second embodiment, program codes that correspond to at least a module for creating the operating status table, a module for creating a record set in the designated period of time, a module for creating the trouble table, a module for totalizing downtime due to trouble, a module for creating the record set for totalizing working time and the module for totalizing working time may be stored in the storage medium of computer 3 (see FIG. 15B).

Thus, in accordance with the present invention as described above, it is possible to realize the provision of an operating state management system which collects and totalizes the operating states of production equipment and well as the conditions under which types of trouble occur in the production equipment, wherein it is easy to manage the data collected and to modify data after totalization.

The present invention is not limited to the above embodiments and various changes and modifications can be made within the spirit and scope of the present invention. Therefore, to apprise the public of the scope of the present invention, the following claims are made.

What is claimed is:

1. An operating state management system comprising database means and a computer for collecting and totalizing the operating states of production equipment and circumstances under which types of trouble occur in said production equipment, said computer including:
    correlating means for storing correlation data in said database means in a time series, the correlation data being obtained by linking the type of trouble that has occurred in the production equipment, the state of the production equipment, and time of day and date at which a change in the state occurred; and
    totalizing means for totalizing states of the production equipment in a designated period of time on the basis of the correlation data.

2. The system according to claim 1, wherein said totalizing means comprises downtime totalizing means for totalizing downtime of the production equipment in the designated period of time on the basis of the correlation data.

3. The system according to claim 1, wherein said totalizing means comprises working time totalizing means for totalizing working time of the production equipment in the designated period of time on the basis of the correlation data.

4. The system according to claim 1, wherein said totalizing means comprises:
    downtime totalizing means for totalizing downtime of the production equipment in the designated period of time on the basis of the correlation data; and
    working time totalizing means for totalizing working time of the production equipment in the designated period of time on the basis of the correlation data.

5. The system according to claim 1, wherein said production equipment comprising:
    timekeeping means; and
    communicating means for communicating type of trouble that has occurred in the production equipment and state of the production equipment to said computer together with time data indicative of time of day and date at which a change in the state occurred.

6. The system according to claim 4, wherein said computer is capable of modifying the correlation data and is capable of re-totalizing the working time and/or downtime on the basis of the correlation data that has been modified.

7. The system according to claim 6, wherein said computer is capable of modifying type of shutdown of the production equipment contained in the correlation data and of excluding this from totalization performed by said downtime totalizing means.

8. The system according to claim 1, wherein said production equipment comprises:
    timekeeping mean; and
    communication means for communicating type of trouble that has occurred in said production equipment and state of said production equipment to said operating state management system together with time data obtained by said timekeeping means indicative of time of day and date at which a change in the state occurred.

9. The system according to claim 8, wherein said communication means is connected to the computer of said operating state management system.

10. A computer for collecting and totalizing the operating states of production equipment and circumstances under which types of trouble occur in said production equipment, said computer comprising:
    correlating means for storing correlation data in external database means in a time series, the correlation data being obtained by linking the type of trouble that has occurred in the production equipment, the state of the production equipment, and time of day and date at which a change in the state occurred; and
    totalizing means for totalizing states of the production equipment in a designated period of time on the basis of the correlation data.

11. The computer according to claim 10, wherein said totalizing means comprises downtime totalizing means for totalizing downtime of the production equipment in the designated period of time on the basis of the correlation data.

12. The computer according to claim 10, wherein said totalizing means comprises working time totalizing means for totalizing working time of the production equipment in the designated period of time on the basis of the correlation data.

13. The computer according to claim 10, wherein said totalizing means comprises:
    downtime totalizing means for totalizing downtime of the production equipment in the designated period of time on the basis of the correlation data; and
    working time totalizing means for totalizing working time of the production equipment in the designated period of time on the basis of the correlation data.

14. The computer according to claim 13, wherein said computer is capable of modifying the correlation data and is capable of re-totalizing the working time and/or downtime on the basis of the correlation data that has been modified.

15. The computer according to claim 14, wherein said computer is capable of modifying type of shutdown of the production equipment contained in the correlation data and of excluding this from totalization performed by said downtime totalizing means.

16. A computer readable memory storing program codes for collecting and totalizing the operating states of production equipment and circumstances under which types of trouble occur in said production equipment, said memory comprising:
    a correlating process code for storing correlation data in external database means in a time series, the correlation data being obtained by linking the type of trouble that has occurred in the production equipment, the state of the production equipment, and time of day and date at which a change in the state occurred; and
    a totalizing process code for totalizing states of the production equipment in a designated period of time on the basis of the correlation data.

17. The memory according to claim 16, wherein said totalizing process code comprises a downtime totalizing process code for totalizing downtime of the production equipment in the designated period of time on the basis of the correlation data.

18. The memory according to claim 16, wherein said totalizing process code comprises a working time totalizing process code for totalizing working time of the production equipment in the designated period of time on the basis of the correlation data.

19. The memory according to claim 16, wherein said totalizing process code comprises:

a downtime totalizing process code for totalizing downtime of the production equipment in the designated period of time on the basis of the correlation data; and a working time totalizing process code for totalizing working time of the production equipment in the designated period of time on the basis of the correlation data.

20. An operating state management system comprising database means and a computer for collecting and totalizing the operating states of production equipment and circumstances under which types of trouble occur in said production equipment, said computer including:

first correlating means for storing first correlation data in said database means in a time series, the first correlation data being obtained by linking the state of the production equipment and time of day and date at which a change in the state occurred;

second correlating means for storing second correlation data in said database means in a time series, the second correlation data being obtained by linking the type of trouble that has occurred in the production equipment and time of day and date at which the production equipment shut down owing to occurrence of the trouble; and totalizing means for totalizing states of the production equipment in a designated period of time on the basis of the first and second correlation data.

21. The system according to claim 20, wherein said totalizing means comprises downtime totalizing means for totalizing downtime of the production equipment in the designated period of time based upon the first and second correlation data.

22. The system according to claim 20, wherein said totalizing means comprises working time totalizing means for totalizing working time of the production equipment in the designated period of time based upon the first and second correlation data.

23. The system according to claim 20, wherein said totalizing means comprises:

downtime totalizing means for totalizing downtime of the production equipment in the designated period of time based upon the first and second correlation data; and working time totalizing means for totalizing working time of the production equipment in the designated period of time based upon the first and second correlation data.

24. The system according to claim 23, wherein said second correlating means is capable of correlating a plurality of troubles of different types that have occurred in the production equipment at the same times, wherein said second correlation means refers to the first correlation data to append, to the second correlation data, time of day and date at which the production equipment resumed operation upon resolution of the troubles; and said downtime totalizing means totalizes downtime by type of trouble based upon the appended second correlation data.

25. The system according to claim 24, wherein said production equipment has timekeeping means and communicates type of trouble that has occurred in the production equipment and state of the production equipment to said computer together with time data indicative of time of day and date at which a change in the state occurred.

26. The system according to claim 25, wherein said computer is capable of modifying the first and second correlation data and is capable of re-totalizing the working time and/or downtime on the basis of the correlation data that has been modified.

27. The system according to claim 26, wherein said computer is capable of modifying type of shutdown of the production equipment contained in the second correlation data and of excluding this from totalization performed by said downtime totalizing means.

28. A computer for collecting and totalizing the operating states of production equipment and circumstances under which types of trouble occur in said production equipment, said computer comprising:

first correlating means for storing first correlation data in external database means in a time series, the first correlation data being obtained by linking the state of the production equipment and time of day and date at which a change in the state occurred;

second correlating means for storing second correlation data in said database means in a time series, the second correlation data being obtained by linking the type of trouble that has occurred in the production equipment and time of day and date at which the production equipment shut down owing to occurrence of the trouble; and totalizing means for totalizing states of the production equipment in a designated period of time on the basis of the first and second correlation data.

29. The computer according to claim 28, wherein said totalizing means comprises downtime totalizing means for totalizing downtime of the production equipment in the designated period of time based upon the first and second correlation data.

30. The computer according to claim 28, wherein said totalizing means comprises working time totalizing means for totalizing working time of the production equipment in the designated period of time based upon the first and second correlation data.

31. The computer according to claim 28, wherein said totalizing means comprises:

downtime totalizing means for totalizing downtime of the production equipment in the designated period of time based upon the first and second correlation data; and working time totalizing means for totalizing working time of the production equipment in the designated period of time based upon the first and second correlation data.

32. The computer according to claim 31, wherein said second correlating means is capable of correlating a plurality of troubles of different types that have occurred in the production equipment at the same times, wherein said second correlation means refers to the first correlation data to append, to the second correlation data, time of day and date at which the production equipment resumed operation upon resolution of the troubles; and said downtime totalizing means totalizes downtime by type of trouble based upon the appended second correlation data.

33. The computer according to claim 32, wherein said computer is capable of modifying the first and second correlation data and is capable of re-totalizing the working time and/or downtime on the basis of the correlation data that has been modified.

34. The computer according to claim 33, wherein said computer is capable of modifying type of shutdown of the production equipment contained in the second correlation data and of excluding this from totalization performed by said downtime totalizing means.

35. A computer readable memory storing program codes for collecting and totalizing the operating states of production equipment and circumstances under which types of trouble occur in said production equipment, said memory comprising:

a first correlating process code for storing first correlation data in external database means in a time series, the first correlation data being obtained by linking the state of the production equipment and time of day and date at which a change in the state occurred;

a second correlating process code for storing second correlation data in said database means in a time series, the second correlation data being obtained by linking the type of trouble that has occurred in the production equipment and time of day and date at which the production equipment shut down owing to occurrence of the trouble; and a totalizing process code for totalizing states of the production equipment in a designated period of time on the basis of the first and second correlation data.

36. The memory according to claim 35, wherein said totalizing process code comprises a downtime totalizing process code for totalizing downtime of the production equipment in the designated period of time based upon the first and second correlation data.

37. The memory according to claim 35, wherein said totalizing process code comprises a working time totalizing process code for totalizing working time of the production equipment in the designated period of time based upon the first and second correlation data.

38. The memory according to claim 33, wherein said totalizing process code comprises:

a downtime totalizing process code for totalizing downtime of the production equipment in the designated period of time based upon the first and second correlation data; and a working time totalizing process code for totalizing working time of the production equipment in the designated period of time based upon the first and second correlation data.

* * * * *

UNITED STATES PATENT AND TRADEMARK OFFICE
CERTIFICATE OF CORRECTION

PATENT NO. : 5,841,964
DATED : November 24, 1998
INVENTOR(S) : Hideki Yamaguchi

It is certified that error appears in the above-identified patent and that said Letters Patent is hereby corrected as shown below:

On the Title page:

Change "Shimomaruko, Japan" to --Tokyo, Japan--.

Column 5, line 46, delete "December 12, 1994", both instances, insert --December 27, 1994--.

Signed and Sealed this

Sixteenth Day of March, 1999

Attest:

Q. TODD DICKINSON

Attesting Officer

Acting Commissioner of Patents and Trademarks